(12) United States Patent
Trottier

(10) Patent No.: US 6,868,584 B2
(45) Date of Patent: Mar. 22, 2005

(54) HANDLE ACCESSORY FOR VEHICLE

(76) Inventor: Steve Trottier, 243, rue Auber, Sorel-Tracy, QC (CA), J3P 5Y5

( * ) Notice: Subject to any disclaimer, the term of this patent is extended or adjusted under 35 U.S.C. 154(b) by 0 days.

(21) Appl. No.: 10/370,337

(22) Filed: Feb. 18, 2003

(65) Prior Publication Data
US 2003/0196299 A1 Oct. 23, 2003

(30) Foreign Application Priority Data
Feb. 21, 2002 (CA) .......................................... 2372324

(51) Int. Cl.$^7$ ................................................ B62K 7/02
(52) U.S. Cl. ........................ 16/421; 16/426; 180/219; 280/304.5
(58) Field of Search .............................. 16/110.1, 111.1, 16/421, 426, 436; 180/219; 280/288.4, 304.4, 304.5; 74/551.1, 551.2, 551.9

(56) References Cited

U.S. PATENT DOCUMENTS 3,935,916 A * 2/1976 Ferraro ........................ 180/219
3,964,564 A * 6/1976 Pittarelli ...................... 180/219
4,111,448 A * 9/1978 Sklodowsky ............. 280/304.4
4,630,703 A * 12/1986 Fletcher ...................... 180/219
5,002,149 A * 3/1991 Watanabe et al. ........... 180/219
5,503,419 A * 4/1996 Gardner ...................... 280/231

FOREIGN PATENT DOCUMENTS

JP 01197189 A * 8/1989
JP 03067794 A * 3/1991

* cited by examiner

Primary Examiner—Chuck Y. Mah
Assistant Examiner—Michael J Kyle
(74) Attorney, Agent, or Firm—Eric Fincham

(57) ABSTRACT

A handle assembly suitable for use by a passenger on a motorcycle, the handle assembly preferably being secured to the fuel access opening on the fuel tank, the handle assembly having a base member and handles secured thereto for gripping by the passenger.

5 Claims, 2 Drawing Sheets

HANDLE ACCESSORY FOR VEHICLE

FIELD OF THE INVENTION

The present invention relates to vehicles and more particularly, relates to a handle assembly for use by a passenger in a vehicle such as a motorcycle.

BACKGROUND OF THE INVENTION

Motorcycles are an increasingly popular form of transportation, perhaps partially due to the fuel economy achieved, manoeuverability and the ease with which parking space can be found. Presently, motorcycles are also popular as touring vehicles for short and extended vacation travel. This popularity has created a demand for methods to adapt a conventional single rider vehicle so that a companion may be accommodated. These adaptations may be made either at the time of ordering the vehicle or as an after purchase option.

Most motorcycles are originally equipped with a single seat for a single operator, but many motorcycle buyers equip their purchase with seats adapted to accommodate two riders. This modification is extensively practiced and makes the vehicle more desirable for extended use for touring and the like.

The popularity of the motorcycle, especially one equipped for two riders, has created a demand for accessories to make the vehicle more pleasant to use. At the present time, a passenger on the vehicle generally holds on to the driver. While this inherently has worked, it would also be desirable that the passenger would be able to grip a portion of the motorcycle when desired.

SUMMARY OF THE INVENTION

It is an object of the present invention to provide a handle assembly for gripping by a passenger on a motorized vehicle such as a motorcycle.

According to one aspect of the present invention, there is provided a handle assembly for use by a passenger on a vehicle, the handle assembly comprising a base member, a plurality of apertures formed in the base member to receive a fastening device, first and second members extending upwardly from the base member, and first and second handles extending outwardly from the members, the handles being substantially parallel to the base member.

According to a further aspect of the present invention, there is provided, in a vehicle having a fuel tank interposed between a pair of handle bars and a rider's seat, the fuel tank having an access opening thereto, the improvement comprising a handle assembly for use by a passenger, the handle assembly being secured about the access opening.

According to a still further aspect of the present invention, there is provided, in a vehicle having a rider's seat, a passenger seat disposed rearwardly thereof, and a pair of handle bars, the improvement comprising a handle assembly mounted forwardly of the rider's seat and rearwardly of the handle bar assembly.

The handle structure of the present invention is particularly suitable for motorcycles although it will understood that it could also be employed with other vehicles wherein a passenger sits behind a vehicle operator—i.e. vehicles such as snowmobiles, personal watercraft, all-terrain vehicles, etc. Also, on certain vehicles, the handle assembly could be used by young children who might be sitting in front of the driver. Indeed, in many vehicles, such an arrangement will provide a safer environment than where the child is sitting rearwardly of the vehicle operator who cannot see what is happening.

In the preferred embodiment, the base member is securable to the structure intermediate the handle bars of the machine and the driver's seat or saddle. On most motorcycles, this structure comprises a fuel tank and which fuel tank has a cap secured to an access opening thereto. As such, most of such structures have threaded apertures for receiving a neck structure. It is these threaded apertures which are designed to receive the fastening means utilized in securing the base of the handle structure to the motorcycle. Naturally, it will be understood that the location of the apertures in the base plate may be varied according to the particular type and model of motorcycle.

The base may assume various configurations and thus, could be arranged to be circular or semi-circular to generally follow the outline of the access opening to the fuel tank. Naturally, other configurations could be utilized.

The handles per se are preferably connected to the base by an intermediate structure although it will be understood that one could utilize handles extending directly outwardly from the base. The handles desirably have a covering thereon in a conventional manner.

The structure may be formed as a single cast unit or alternatively, may be made of separate portions secured together. Preferably, it is of a metallic material such as a stainless steel.

BRIEF DESCRIPTION OF THE DRAWINGS

Having thus generally described the invention, reference will be made to the accompanying drawings illustrating an embodiment thereof, in which.

PREFERRED EMBODIMENTS OF THE PRESENT INVENTION

Figure 1:
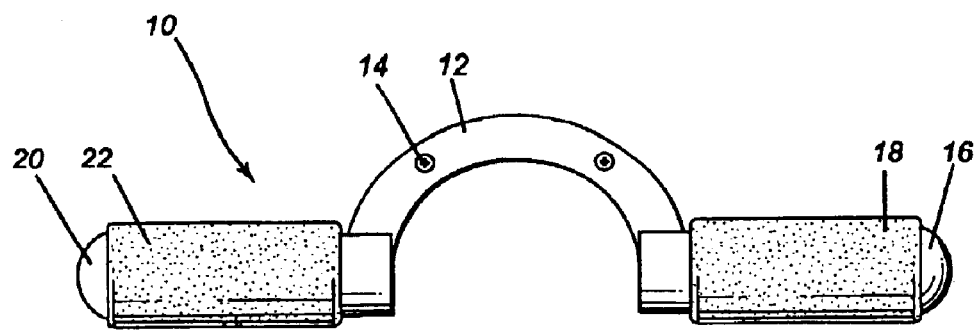
FIG. 1 is a top plan view of a handle member according to one embodiment of the present invention.
Figure 2:
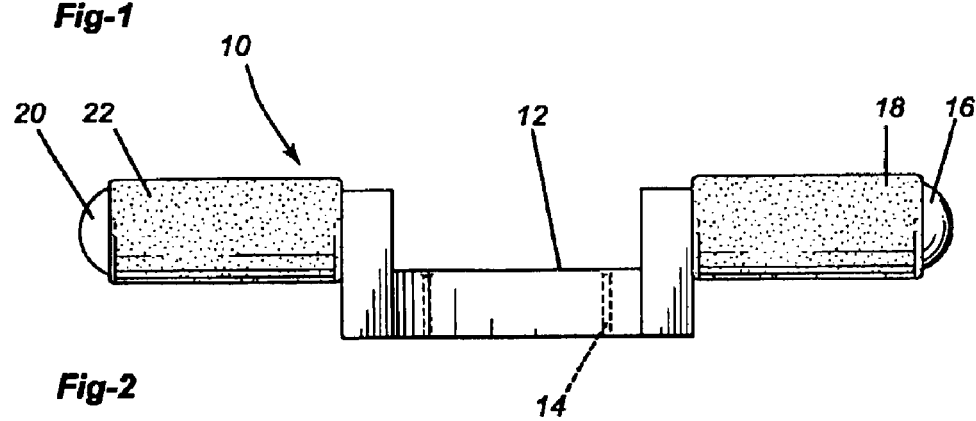
FIG. 2 is a rear elevational view thereof.

Referring to the drawings in greater detail and by reference characters thereto, there is illustrated in FIG. 1 a handle member according to an embodiment of the present invention and which handle member is generally designated by reference numeral 10.

Handle member 10 includes a base portion 12 which is of a arcuate semi-circular configuration and includes a pair of apertures 14 formed therein. Secured to one end of base portion 12 is an outwardly extending handle 16 having a grip 18 thereon. At the other end of base portion 12, there is also provided an outwardly extending handle 20 having a grip 22 thereon.

Base portion 12 and handles 16, 20 may be formed of any suitable material although they are preferably formed of an aluminum material and have grips 18, 22 formed of a conventional foam like material. This provides a handle member which is light, strong and aesthetic. It will, of course, be understood that other materials may be used.

Figure 3:
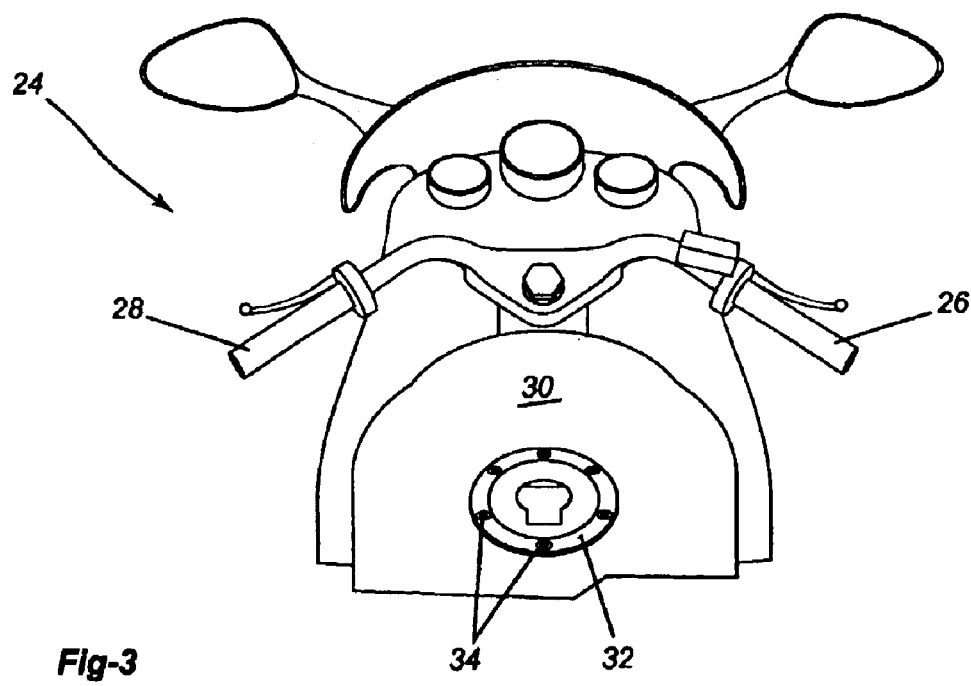
FIG. 3 is a rear perspective view illustrating a front portion of a motorcycle.
Figure 4:
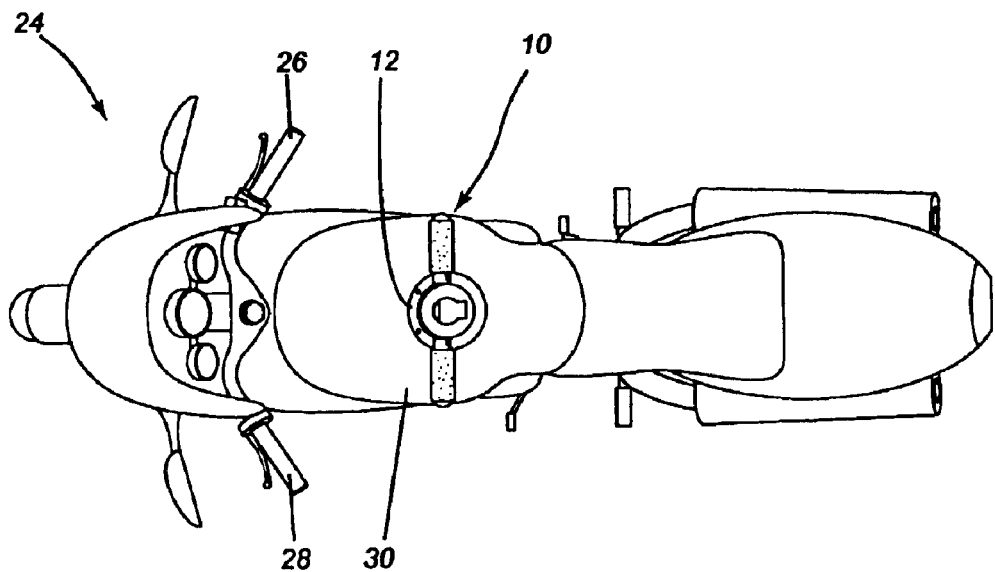
FIG. 4 is a top view of a motorcycle showing the handle member of the present invention secured thereto.

As shown in FIGS. 3 and 4, there is provided a conventional motorcycle 24 having conventional handles 26 and 28. A fuel reservoir 30 is centrally located and fuel reservoir 30 includes a base plate member 32 screw threadedly engaged therewith to receive a cap for the fuel tank. As aforementioned, screws 34 retain base plate member 32.

According to the present invention, handle member 10 may be mounted as seen in FIG. 4 so as to provide a gripping means for a passenger.

Figure 5:
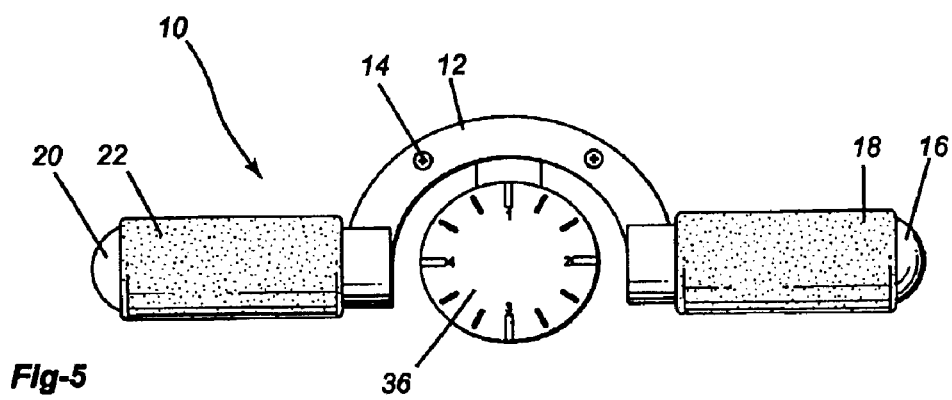
FIG. 5 is a top plan view of a second embodiment of a handle member according to the present invention.

Turning to the embodiment of FIG. 5, similar reference numerals have been employed for similar components. As may be seen in FIG. 5, this embodiment includes a clock or watch 36 which is secured to the base portion 12.

Figure 6:
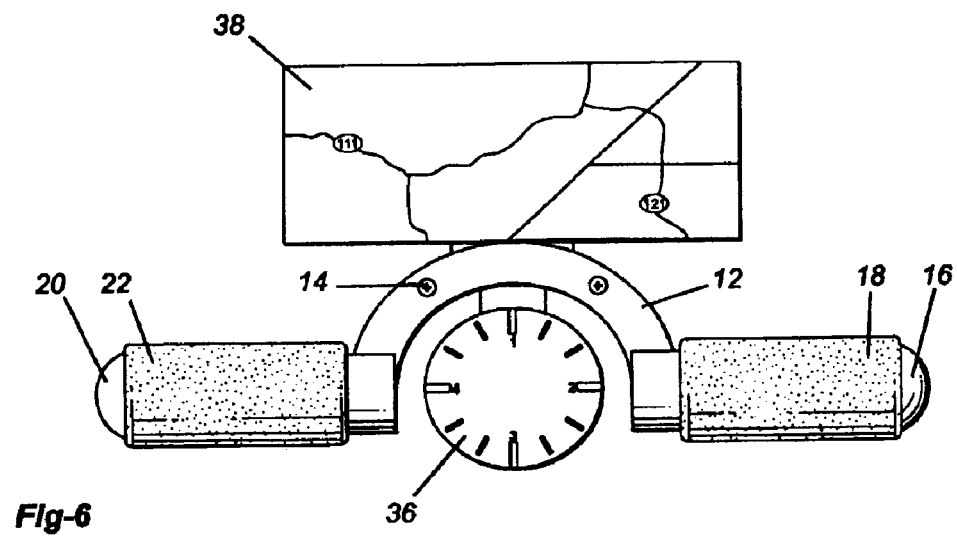
FIG. 6 is a top plan view of a still further embodiment of a handle member according to the present invention.

In the embodiment of FIG. 6, again similar reference numerals have been employed for similar components. In this embodiment, there is illustrated a watch 36 attached to base portion 12 and also a support 38 for a map or other papers. Naturally, one could employ only the support 38 without the watch or clock 36.

The handles 16 and 20 may be releasably attached to base portion 12 and thus different styles of handle grips may be employed.

It will be understood that the above described embodiment is for purposes of illustration only and that changes or modifications may be made thereto without departing from the spirit and scope of the invention. Thus, for example, the handles of the present invention could be attached at other places—i.e. to the chassis or the like. Naturally, they could also be incorporated in the original manufacture of the motorcycle.

I claim:

1. In a vehicle having a fuel tank interposed between a pair of handle bars and a rider's seat, the fuel tank having an access opening thereto, said access opening having a base plate member thereabout designed to receive a cap for covering said access opening, said base plate member being secured by a plurality of screw threaded members the improvement comprising a handle assembly for use by a passenger, said handle assembly being secured about said access opening to said base plate member by said screw threaded members.

2. The improvement of claim 1 wherein said handle assembly comprises a base portion, a plurality of apertures formed in said base portion to receive said screw threaded members securing said base portion to said base plate member about said access opening, first and second members extending upwardly from said base member, and first and second handles extending outwardly from said upwardly extending members.

3. The improvement of claim 1 wherein said vehicle is a motorcycle.

4. The improvement of claim 2 wherein said handles further include a cushioning material thereon.

5. The improvement of claim 2 wherein said base portion further includes a retainer assembly designed to fixedly retain a further component.

* * * * *